(12) United States Patent
Johnson et al.

(10) Patent No.: US 10,971,127 B2
(45) Date of Patent: Apr. 6, 2021

(54) ENCLOSURE FOR A GAS TURBINE ENGINE

(71) Applicant: General Electric Company, Schenectady, NY (US)

(72) Inventors: Randy Ray Johnson, Liberty Township, OH (US); Steven Robert Linnemann, Cincinnati, OH (US); Loren Lee Long, Mason, OH (US); Brian MacDonald Linnemann, Cincinnati, OH (US); Justin Sanjay Rao, Cincinnati, OH (US); John Joseph Wunsch, West Chester, OH (US); Andrew William Spirk, Middletown, OH (US); Adam Patrick Young, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 15/925,921

(22) Filed: Mar. 20, 2018

(65) Prior Publication Data
US 2019/0295520 A1    Sep. 26, 2019

(51) Int. Cl.
| | | |
|---|---|---|
| *G10K 11/168* | (2006.01) | |
| *F02C 6/20* | (2006.01) | |
| *B63H 21/16* | (2006.01) | |
| *B32B 3/26* | (2006.01) | |
| *B32B 27/06* | (2006.01) | |
| *B32B 27/36* | (2006.01) | |
| *B32B 27/30* | (2006.01) | |

(Continued)

(52) U.S. Cl.
CPC ............ *G10K 11/168* (2013.01); *B32B 3/266* (2013.01); *B32B 9/02* (2013.01); *B32B 27/06* (2013.01); *B32B 27/20* (2013.01); *B32B 27/30* (2013.01); *B32B 27/36* (2013.01); *B32B 27/38* (2013.01); *B63H 21/16* (2013.01); *F02C 6/203* (2013.01); *B32B 2262/106* (2013.01); *B32B 2307/102* (2013.01); *F05D 2220/32* (2013.01); *F05D 2260/96* (2013.01)

(58) Field of Classification Search
CPC ......... B32B 3/266; B32B 27/20; B32B 27/06; B32B 27/30; B32B 27/36; B32B 27/38; B32B 2262/106; F05D 2220/32; F05D 2260/96; B63H 21/16; G10K 11/168; F02C 6/203
See application file for complete search history.

(56) References Cited

U.S. PATENT DOCUMENTS

| | | |
|---|---|---|
| 3,504,871 A | 4/1970 | Weigmann |
| 5,273,819 A | 12/1993 | Jex |

(Continued)

FOREIGN PATENT DOCUMENTS

| | | |
|---|---|---|
| DE | 102008031277 A1 | 1/2010 |
| EP | 1657374 A2 | 5/2006 |

OTHER PUBLICATIONS

Great Britain Search Report Corresponding to Application No. 1903729 dated Sep. 16, 2019.

*Primary Examiner* — Forrest M Phillips
(74) *Attorney, Agent, or Firm* — Dority & Manning, P.A.

(57) ABSTRACT

An engine enclosure for containing a gas turbine engine is provided. An exemplary engine enclosure includes features that improve noise and thermal attenuation, reduce the weight of the enclosure, and provide for more accessible access points to the interior volume of the engine enclosure.

20 Claims, 7 Drawing Sheets

(51) Int. Cl.
  *B32B 27/38* (2006.01)
  *B32B 9/02* (2006.01)
  *B32B 27/20* (2006.01)

(56) References Cited

U.S. PATENT DOCUMENTS

| | | | |
|---|---|---|---|
| 6,722,466 B1 * | 4/2004 | Tong | E04B 1/8218 |
| | | | 181/200 |
| 7,467,687 B2 * | 12/2008 | Mitchell | E04B 1/8218 |
| | | | 181/200 |
| 7,604,095 B2 * | 10/2009 | Mitchell | B63G 13/02 |
| | | | 181/210 |
| 7,972,698 B2 | 7/2011 | Miller et al. | |
| 8,101,272 B1 | 1/2012 | Schmidt | |
| 8,945,325 B2 | 2/2015 | Everhart et al. | |
| 8,951,375 B2 | 2/2015 | Havens et al. | |
| 9,027,351 B2 * | 5/2015 | Baten | F01D 25/285 |
| | | | 60/772 |
| 10,741,158 B1 * | 8/2020 | Aune | G10K 11/162 |
| 2015/0083822 A1 | 3/2015 | Mecuson et al. | |
| 2017/0151712 A1 | 6/2017 | La Forest et al. | |

* cited by examiner

ENCLOSURE FOR A GAS TURBINE ENGINE

FIELD

The present subject matter relates generally to engine enclosures for containing gas turbine engines.

BACKGROUND

Some gas turbine engines are contained within an enclosure to protect the engine from the environment and to shield a surrounding structure, such as a ship, from the gas turbine engine. Engine enclosures for ships are commonly located in a lower portion of a hull of the ship and typically include an inlet area, an exhaust area, and an engine area that extends between the inlet area and the exhaust area. During operation of the engine, the amount of noise and heat emanating from the engine into the machinery space or engine room may be significant.

Conventional engine enclosures are typically constructed of four separate walls and a roof each formed of carbon steel. The carbon steel walls and roof make the enclosure relatively heavy. The weight of such enclosures presents challenges for ship designers, as buoyancy and stability of ships are affected by the weight of the enclosure. Further, the carbon steel walls are prone to rusting in salt laden environments. As a result, costs to repair excessive corrosion and rust-through of the walls and roof of such carbon steel enclosures may be significant over their respective lifecycles. In addition, as the walls and roof of conventional enclosures are usually separate pieces connected together to form a rectangular cuboid shape, the seams or joints between the walls and roof allow heat and noise to emanate outwardly from the enclosure, which may make the working environment for shipboard personnel severe. Conventional enclosures also typically include a number of carbon steel access points, including access hatches, panels, and doors. The access points can be used e.g., for access to the gas turbine engine contained within the enclosure. In addition to the challenges noted above with respect to the carbon steel walls and roof, such access points are sometimes difficult for operators to open and move due to their weight, and/or corrosion of the carbon steel.

Accordingly, engine enclosures that address one or more of the challenges noted above would be useful.

BRIEF DESCRIPTION

Aspects and advantages of the invention will be set forth in part in the following description, or may be obvious from the description, or may be learned through practice of the invention.

In one exemplary aspect, the present disclosure is directed to an enclosure for containing at least a portion of a gas turbine engine. The enclosure includes at least one wall defining at least a portion of an interior volume of the enclosure. The wall of the enclosure includes a first insulation panel. The wall of the enclosure also includes a sound absorption member positioned outwardly of the first insulation panel with respect to the interior volume. The wall of the enclosure further includes an acoustic barrier positioned adjacent to and outwardly of the sound absorption member with respect to the interior volume. Moreover, the wall of the enclosure includes an outer shell positioned outwardly of the acoustic barrier with respect to the interior volume, wherein the outer shell is formed of a composite material.

In some embodiments, the sound absorption member is a first sound absorption member and the acoustic barrier is a first acoustic barrier. In such embodiments, the wall of the enclosure further includes a second sound absorption member positioned outwardly of the first acoustic barrier with respect to the interior volume. Further, the wall of the enclosure further includes a second acoustic barrier positioned adjacent to and outwardly of the second sound absorption member with respect to the interior volume.

In some embodiments, the wall of the enclosure further includes a third sound absorption member positioned outwardly of the second acoustic barrier with respect to the interior volume. Further, the wall of the enclosure also includes a third acoustic barrier positioned adjacent to and outwardly of the third sound absorption member with respect to the interior volume.

In some embodiments, the third acoustic barrier is positioned adjacent to and inwardly of the outer shell.

In some embodiments, a second insulation panel is positioned between the first insulation panel and the sound absorption member.

In some embodiments, the second insulation panel is positioned adjacent to the first insulation panel.

In some embodiments, the acoustic barrier is a vinyl mat.

In some embodiments, a perforated sheet is positioned adjacent to and inwardly of the first insulation panel.

In some embodiments, the perforated sheet is formed of a Polyethylene Terephthalate material.

In some embodiments, the sound absorption member is formed of mineral wool.

In some embodiments, the composite material of the outer shell is a carbon fiber reinforced phenolic composite material.

In some embodiments, the wall has a thickness that is less than or equal to about four (4) inches.

In another exemplary aspect, the present disclosure is directed to an enclosure for containing at least a portion of a gas turbine engine. The enclosure includes a plurality of walls defining an interior volume, a monolithic outer shell coupling adjacent walls and forming at least a portion of each of the walls, the monolithic outer shell formed of a composite material. At least one of the walls includes a first insulation panel. The wall also includes a sound absorption member positioned outwardly of the first insulation panel with respect to the interior volume. The wall further includes an acoustic barrier positioned adjacent to and outwardly of the sound absorption member with respect to the interior volume. In addition, the outer shell is positioned outwardly of the acoustic barrier with respect to the interior volume.

In some embodiments, the enclosure further includes a roof coupled with one or more of the plurality of walls by the monolithic outer shell, and wherein the outer shell forms at least a portion of the roof.

In some embodiments, the enclosure further includes a floor coupled with one or more of the plurality of walls by the monolithic outer shell, and wherein the outer shell forms at least a portion of the floor.

In some embodiments, the enclosure further includes an access point for selectively accessing the interior volume of the enclosure. The access point includes a perforated sheet and an insulation panel positioned outwardly of the perforated sheet with respect to the interior volume. The access point further includes an epoxy layer positioned outwardly of the insulation panel along at least a part of the access point with respect to the interior volume. The access point also includes at least one acoustic panel positioned outwardly of the epoxy layer with respect to the interior volume. Additionally, the access point includes an outer shell positioned outwardly of the acoustic panel with respect to the interior volume.

In another exemplary aspect, the present disclosure is directed to an enclosure for containing at least a portion of a gas turbine engine. The enclosure includes at least one wall defining at least a portion of an interior volume of the enclosure. The wall of the enclosure includes a first insulation panel. The wall also includes an acoustic panel positioned outwardly of the first insulation panel with respect to the interior volume, the first acoustic panel comprising a sound absorption member and an acoustic barrier. Further, the wall also includes an outer shell formed of a composite material and positioned outwardly of the acoustic panel with respect to the interior volume. In addition, the wall includes a hat stiffener. The hat stiffener includes a hat member defining a stiffener volume, the hat member comprising a first flange attached to the outer shell, a hat portion extending inwardly from the outer shell, and a second flange attached to the outer shell. The hat stiffener also includes a foam member disposed within the stiffener volume.

In some embodiments, the hat member further includes an inner member and an outer member positioned outwardly of the inner member with respect to the interior volume, the inner and outer members of the hat member positioned at an inner portion of the hat member, wherein the inner member and the outer member define an inner volume. The hat member also includes a stiffening member disposed within the inner volume.

In some embodiments, the acoustic panel is a first acoustic panel and the sound absorption member is a first sound absorption member and the acoustic barrier is a first acoustic barrier, and wherein the first acoustic barrier is positioned outwardly of the first sound absorption member with respect to the interior volume. In such embodiments, the wall of the enclosure further includes a second acoustic panel positioned outwardly of the first acoustic panel with respect to the interior volume, the second acoustic panel comprising a second sound absorption member and a second acoustic barrier and a third acoustic panel positioned outwardly of the second acoustic panel with respect to the interior volume, the third acoustic panel comprising a third sound absorption member and a third acoustic barrier. The hat portion extends inwardly from the outer shell to an inner surface of the first sound absorption member.

In some embodiments, the first flange is disposed between the third acoustic barrier and the outer shell and the second flange is disposed between the third acoustic barrier and the outer shell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
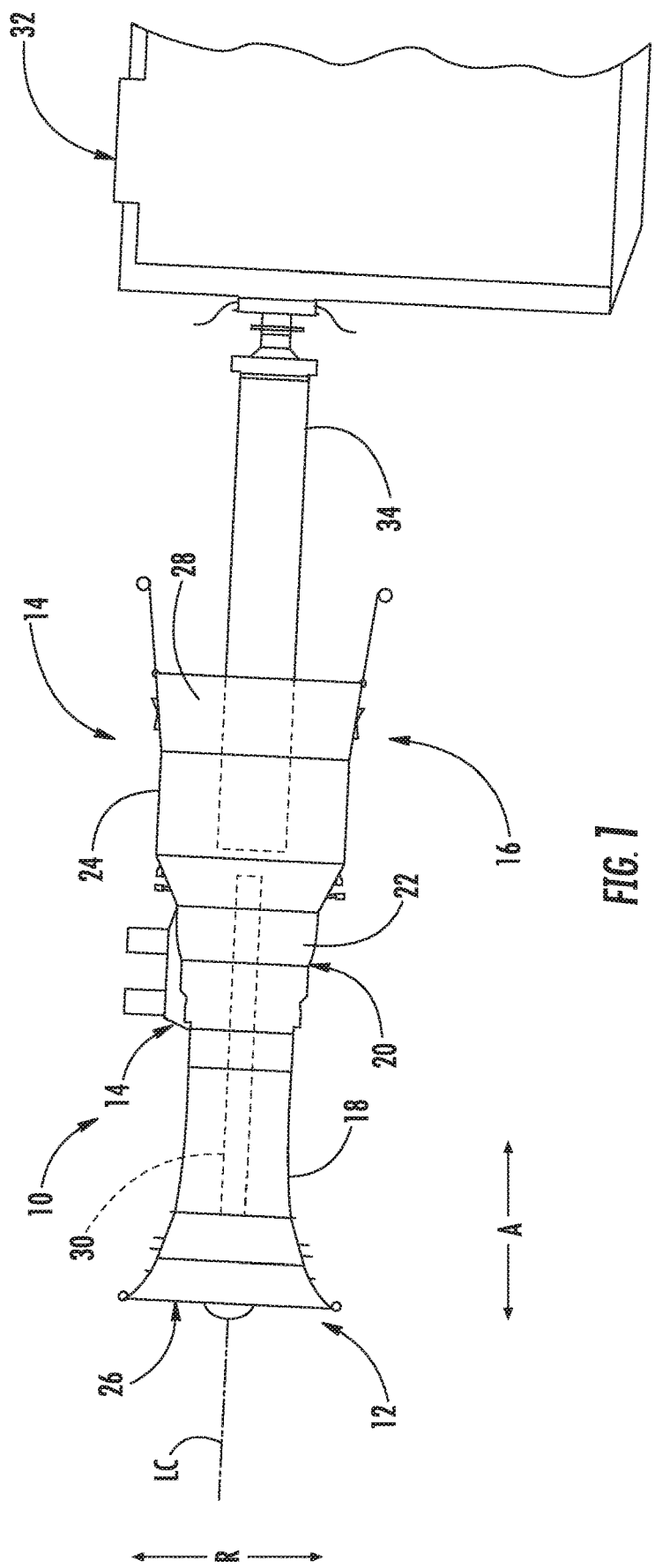
FIG. 1 provides a schematic cross-sectional view of an exemplary gas turbine engine according to various embodiments of the present disclosure.

Repeat use of reference characters in the present specification and drawings is intended to represent the same or analogous features or elements.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Furthermore, as used herein, terms of approximation, such as "approximately," "substantially," or "about," refer to being within a ten percent (10%) margin of error.

Exemplary aspects of the present disclosure are directed to an engine enclosure for containing a gas turbine engine. The engine enclosure provided herein includes features that improve noise and thermal attenuation, reduce the weight of the enclosure, reduce the rate of corrosion and rust-through of the enclosure, and provide for access points (e.g., an access panel) that make access to the interior volume of the engine enclosure easier. In particular, in one exemplary aspect, the outer shell of the enclosure is formed of a composite material, such as e.g., a carbon phenolic composite material. Further, the composite outer shell is formed as a single monolithic unitary component. In this way, the weight of the enclosure is reduced, the rate of corrosion and rust-through of the enclosure is reduced, and noise and heat attenuation may be improved as there are no seams or joints in the composite outer shell. Further, access points also include an outer shell formed of a composite material. In this way, the weight of the access points are reduced, which facilitates access to the interior volume of the engine enclosure. Moreover, as described herein, the construction of the walls, roof, and/or floor of the enclosure are constructed in such a way that noise and heat attenuation is improved, among other benefits.

FIG. 1 provides a schematic view of an exemplary gas turbine engine 10 in accordance with an exemplary embodiment of the present disclosure. The gas turbine engine 10 defines an axial direction A (extending parallel to a longitudinal centerline LC provided for reference), a radial direction R, and a circumferential direction (extending three hundred sixty degrees (360°) about the axial direction A; not depicted). The gas turbine engine 10 includes an inlet portion 12, an engine portion 14, and an exhaust portion 16. Engine portion 14 includes at least one compressor 18, a combustor 20, a high pressure turbine 22, and a low pressure turbine 24 connected serially. The gas turbine engine 10 defines an inlet 26 at inlet portion 12, and exhaust portion 16 includes an exhaust nozzle 28. For this embodiment, compressor 18 and turbine 22 are coupled by a first shaft 30, and turbine 24 and a driven load 32 are coupled by a second shaft 34.

In operation, air flows into inlet 26 and downstream to compressor 18 where the air is compressed. The compressed air is then channeled to combustor 20 where it is mixed with fuel and ignited. The resultant combustion gases flow downstream from combustor 20 and drive rotating HP and LP turbines 22, 24 and exit gas turbine engine 10 through exhaust nozzle 28. As LP turbine 24 is driven, the second shaft 34 coupled thereto drives the driven load 32.

It will be appreciated that, although described with respect to the gas turbine engine of FIG. 1, which is a marine gas turbine engine, the present subject matter may be applicable to other types of turbomachinery.

Figure 2:
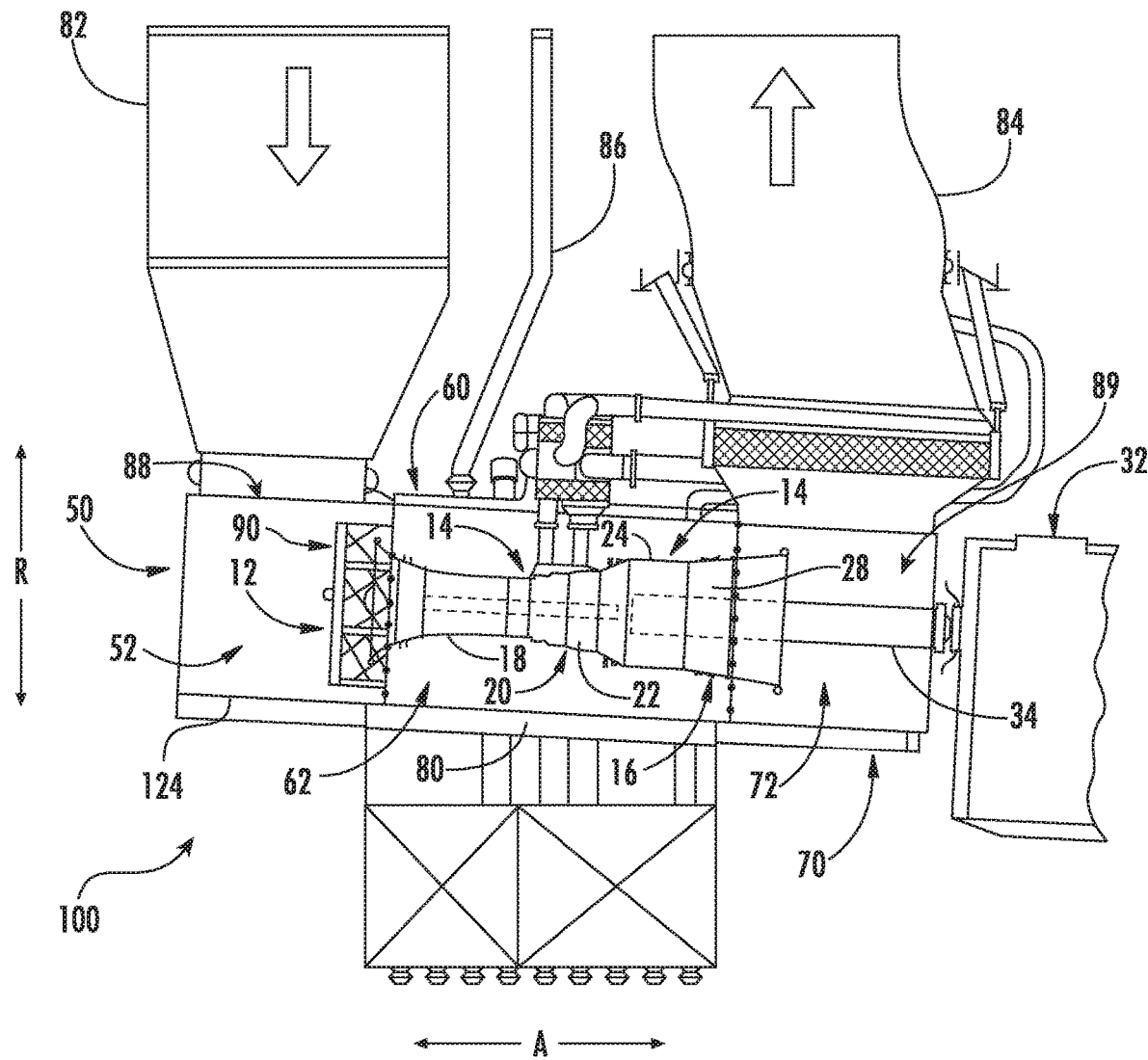
FIG. 2 provides a schematic view of an exemplary engine enclosure according to various embodiments of the present disclosure.

FIG. 2 provides a perspective view of an exemplary engine enclosure 100 in accordance with various exemplary embodiments of the present disclosure. As shown, engine enclosure 100 is configured to contain or house a gas turbine engine. For instance, in the depicted embodiment of FIG. 2, the engine enclosure 100 contains the marine gas turbine engine 10 of FIG. 1.

As shown in FIG. 2, the engine enclosure 100 includes an inlet module 50 for containing inlet portion 12 of engine 10, an engine module 60 for containing engine portion 14 of engine 10, and an exhaust module 70 for containing exhaust portion 16 of engine 10. In the depicted exemplary embodiment, a base 80 is coupled with the engine module 60 for supporting the engine enclosure 100. Engine enclosure 100 may be used within structures (not shown) that utilize power generated by engine 10. For example, engine enclosure 100 may be installed within a ship or a trailer (not shown). For this embodiment, modules 50, 60, 70 are positioned adjacent each other and/or are coupled for generally containing the gas turbine engine 10. More specifically, inlet module 50 defines a cavity 52 that is sized and/or shaped to at least partially contain engine inlet portion 12 therein. Similarly, the engine module 60 defines a cavity 62 that is sized and/or shaped to at least partially contain engine portion 14 therein, and exhaust module 70 defines a cavity 72 that is sized and/or shaped to at least partially contain engine exhaust portion 16 therein.

An inlet port 82 is coupled with the inlet module 50 of the engine enclosure 100 and is configured for receiving an airflow into the cavity 62 of the inlet module 50 for use by the gas turbine engine 10. The inlet port 82 is in fluid communication with an inlet 88 defined by the engine enclosure 100. Similarly, an outlet port 84 is coupled with the exhaust module 70 and is configured for exhausting a flow of combustion gases generated by engine 10. The outlet port 84 is in fluid communication with an outlet 89 defined by the engine enclosure 100. A cooling duct 86 is in fluid communication with the engine enclosure 100 and is configured to supply a cooling airflow from a cooling system (not shown) to the engine module 60 for cooling the engine 10 during operation. A foreign object damage (FOD) screen assembly 90 is positioned within the inlet module 50 and is coupled to an interior or barrier wall of the engine enclosure 100 over an opening defined by the barrier wall. The FOD screen assembly 90 protects the gas turbine engine 10 from ingesting foreign object debris that may flow downstream through the inlet port 82.

Figure 3:
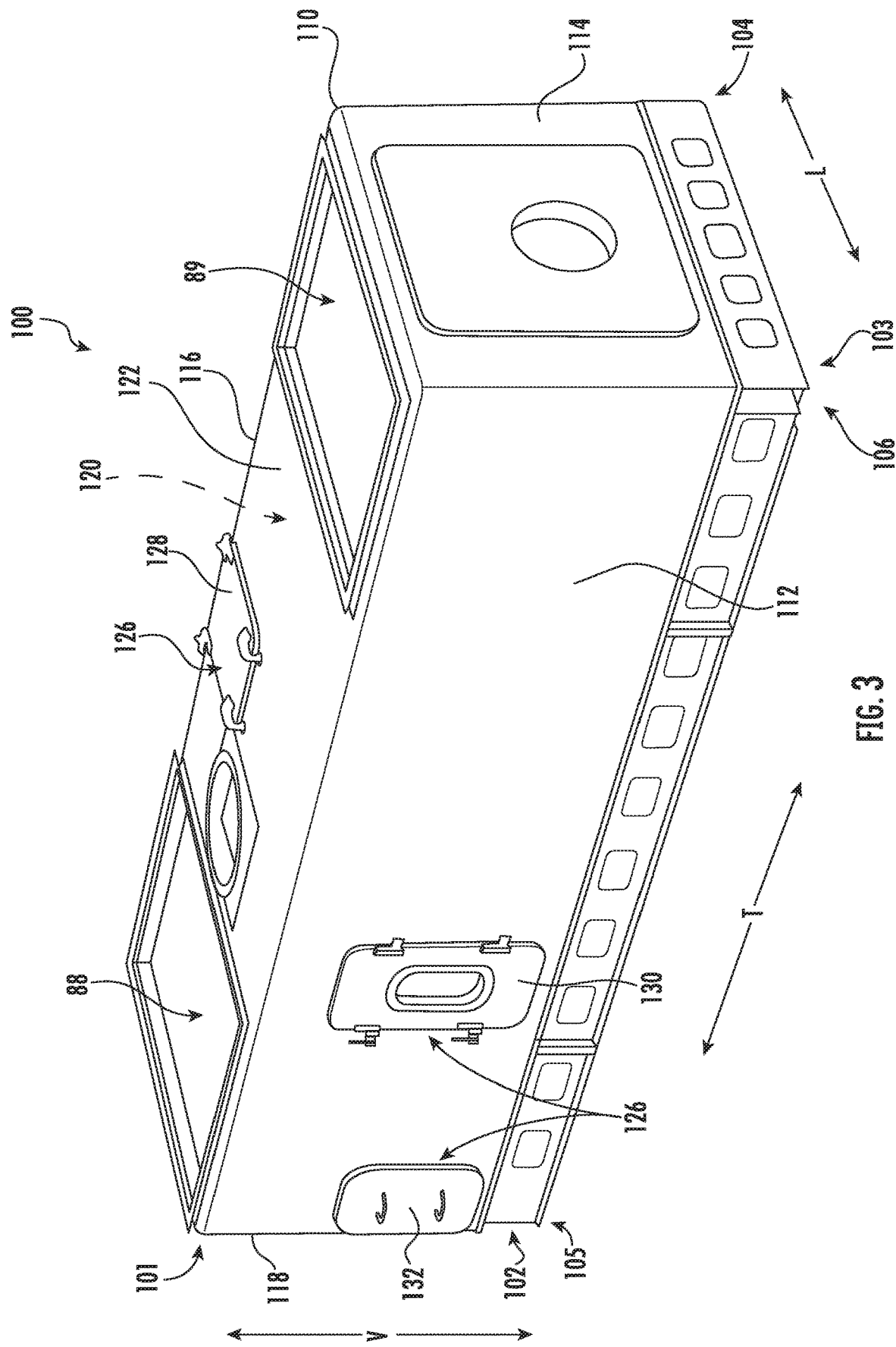
FIG. 3 provides a perspective view of the engine enclosure of FIG. 2.

FIG. 3 provides a perspective view of the engine enclosure 100 of FIG. 2. As shown in FIG. 3, the engine enclosure 100 includes an outer shell 110 that extends between a top 101 and a bottom 102 along a vertical direction V. The outer shell 110 also extends between a first side 103 and a second side 104 along a lateral direction L and between a front 105 and a rear 106 along a transverse direction T. Vertical direction V, lateral direction L, and transverse direction T are mutually perpendicular and form an orthogonal direction system.

Moreover, for this exemplary embodiment, the engine enclosure 100 includes a first wall 112, a second wall 114 that is coupled to first wall 112, a third wall 116 that is coupled to second wall 114, and a fourth wall 118 that is coupled to third wall 116 and first wall 112 such that engine enclosure 100 defines an approximately rectangular enclosure or interior volume 120 that is suitably sized to enclose and contain engine 10 (FIG. 2). More specifically, first wall 112 is spaced from third wall 116 along the lateral direction L and is substantially parallel to third wall 116. First wall 112 is also substantially perpendicular to second and fourth walls 114, 118, respectively. Second wall 114 is spaced from fourth wall 118 along the transverse direction T. Second wall 114 is also substantially parallel to fourth wall 118. Moreover, second wall 114 is substantially perpendicular to first and third walls 112, 116, respectively. In the depicted embodiment of FIG. 3, engine enclosure 100 also includes a roof 122 coupled to an upper surface of first, second, third, and fourth walls 112, 114, 116, 118, respectively, such that engine 10 is enclosed within engine enclosure 100. In some embodiments, engine enclosure 100 may include a floor 124 (FIG. 2) that, if included, is coupled to a lower surface of first, second, third, and fourth walls 112, 114, 116, 118, respectively.

Further, for this exemplary embodiment, the outer shell 110 of the enclosure 110 is a monolithic component formed of a composite material. That is, the walls 112, 114, 116, 118 and the roof 122 are integrally formed as a single, unitary composite component. The monolithic outer shell 110 couples adjacent walls (and the roof 122 and floor 124) and forms at least a portion of each of the walls (and the roof 122 and floor 124). Further, in some embodiments, the outer shell 110 of the walls 112, 114, 116, 118 and roof 122 may be formed of a polymer matrix composite (PMC) material. For this embodiment, the composite material of the outer shell 110 of the enclosure 100 is a carbon fiber reinforced phenolic composite material. By forming the enclosure 100 as a single monolithic composite component, the outer shell 110 of the enclosure 100 is seamless, which may provide improved heat and sound attenuation, e.g., compared to an engine enclosure having a carbon steel roof and walls formed of separate pieces connected together. Further, the composite outer shell 110 provides a weight reduction of the engine enclosure, e.g., compared to an engine enclosure having a carbon steel roof and walls. In addition, as carbon fiber reinforced phenolic composite material is less prone to corrosion and rust-through, costly repairs and lifecycle costs may be reduced. Yet another advantage of forming the outer shell 110 of a composite material is the reduction in weight of the enclosure, e.g., compared to enclosures formed of carbon steel. This may, for example, assist ship builders with buoyancy and stability. A reduction in weight of the enclosure and thus a reduction in ship weight may allow a ship to patrol in littoral waters, for instance. Forming the outer shell 110 as a monolithic composite component may have other advantages as well.

As further depicted in FIG. 3, engine enclosure 100 includes a number of access points 126. In particular, one of the access points 126 is an access hatch 128 that provides access to the interior volume 120 of engine enclosure 100 from the roof 122. The access hatch 128 may be rotatably hinged or removably mounted to roof 122. When the access hatch 128 is removed or rotated to an open position, an operator may access engine 10 through an opening defined by roof 122. Another access point 126 of the engine enclosure 100 includes an access door 130 that may be rotatably hinged or removably mounted to the first wall 112 of the engine enclosure 100. For this embodiment, the access door 130 is rotatably hinged to the first wall 112 of the engine enclosure 100. When the access door 130 is removed or rotated to an open position, an operator may access the engine module 60 of the enclosure 100 through an opening defined by the first wall 112. In this way, the engine portion 14 of the engine 10 may be accessed for maintenance, for example. Moreover, another access point 126 of the engine enclosure 100 includes an access panel 132 that may be rotatably hinged or removably mounted to the first wall 112 of the engine enclosure 100. When the access panel 132 is removed or rotated to an open position, an operator may access the inlet portion 12 of the engine 10 through an opening defined by the first wall 112, or more broadly the inlet module 50. The engine enclosure 100 may include other access points 126 as well.

For this embodiment, like the monolithic outer shell 110 that forms the outer surface of the walls 112, 114, 116, 118, roof 122, and floor 124, one or more of the access points 126 likewise have an outer shell that is formed of a composite material. Moreover, for this embodiment, the composite material of the outer shell of the one or more access points 126 is a carbon fiber reinforced phenolic composite material. Preferably, in some embodiments, the outer shell of each of the access points 126 are formed of a composite material. By forming the outer shell of one or more the access points 126 of a composite material, in addition to the advantages noted above with respect to the composite outer shell 110 of the enclosure 100, the reduced weight of the access points 126 may allow for an operator to open and close the access points more easily, e.g., compared to a relatively heavy carbon steel access point.

Figure 4:
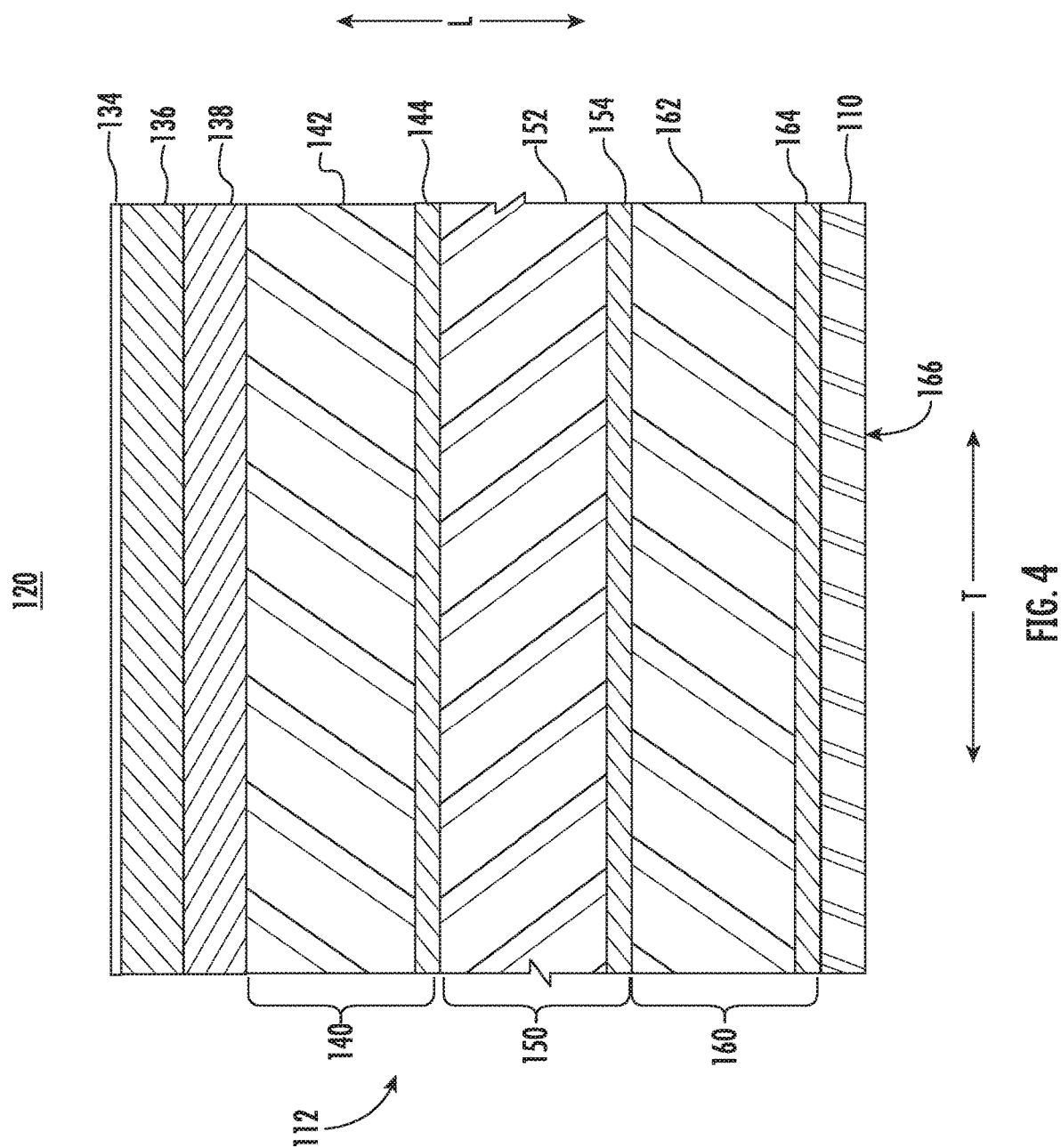
FIG. 4 provides a cross sectional view of one of the walls of the enclosure of FIG. 3 according to an exemplary embodiment of the present disclosure.

FIG. 4 provides a cross sectional view of one of the walls of the engine enclosure 100 of FIG. 3 according to an exemplary embodiment of the present disclosure. The wall depicted in FIG. 4 is representative of the construction of one or more of the walls 112, 114, 116, 118, roof 122, or if included, the floor 124, of the engine enclosure 100. In FIG. 4, the wall is denoted as the first wall 112.

As shown in FIG. 4, the first wall 112 defines at least a portion of the interior volume 120 of the enclosure 100. The first wall includes 112 includes, in sequence outwardly from the interior volume 120 of the enclosure 100, a perforated sheet 134. The perforated sheet 134 includes a plurality of perforations therethrough. The perforated sheet 134 may be formed of a metal material, such as steel, or in some exemplary embodiments, the perforated sheet 134 is formed of a Polyethylene Terephthalate (PET) material. The perforated sheet 134 is positioned adjacent to and inwardly of a first insulation panel 136. Stated differently, the first insulation panel 136 is positioned adjacent to and outwardly of the perforated sheet 134. The first insulation panel 136 may be a non-combustible, shock and vibration resistant flexible or rigid microporous insulation panel with thermal properties suitable for attenuating temperatures within an enclosure 100. For example, the first insulation panel 136 may be a MICROTHERM® overstitched panel formulated of an opacified blend of filament reinforced pyrogenic silica. A second insulation panel 138 is positioned adjacent to and outwardly of the first insulation panel 136. The second insulation panel 138 may be formed of the same material as the first insulation panel 136. By positioning the second insulation panel 138 adjacent the first insulation panel 136, the second insulation panel 138 prevents sound and/or heat that leaks through the first insulation panel 136 from escaping outward away from the interior volumen 120. Preferably, the second insulation panel 138 is positioned such that it covers any seams or joints along the first insulation panel 136.

As further depicted in FIG. 4, a first acoustic panel 140 is positioned adjacent to and outwardly of the second insulation panel 136 with respect to the interior volume 120. The first acoustic panel 140 includes a first sound absorption member 142 that is positioned adjacent to and outwardly of second insulation panel 136 and a first acoustic barrier 144 that is positioned adjacent to and outwardly of the first sound absorption member 142. For this embodiment, the first sound absorption member 142 is formed of a mineral wool material that provides thermal insulation, fire containment, and acoustical attenuation. The first acoustic barrier 144 is formed of a vinyl mat material that provides a noise barrier for sound that travels through the first sound absorption member 142. That is, the first acoustic panel 140 facilitates containment of the sounds within the interior volume 120 and reduces sound transmission outwardly from the interior volume 120.

A second acoustic panel 150 is positioned adjacent to and outwardly of the first acoustic panel 140 with respect to the interior volume 120. The second acoustic panel 150 includes a second sound absorption member 152 that is positioned adjacent to and outwardly of first acoustic barrier 144 and a second acoustic barrier 154 that is positioned adjacent to and outwardly of the second sound absorption member 152. For this embodiment, the second sound absorption member 152 is formed of the same material as the first sound absorption member 142 (i.e., a mineral wool material) and the second acoustic barrier 154 is formed of the same material as the first acoustic barrier 144 (i.e., a vinyl mat material). The second acoustic panel 150 further attenuates the sound and heat emanating from the engine 10 contained within the interior volume 120 of the enclosure 100.

As further shown in FIG. 4, a third acoustic panel 160 is positioned adjacent to and outwardly of the first acoustic panel 140 and the second acoustic panel 150 with respect to the interior volume 120. The third acoustic panel 160 includes a third sound absorption member 162 that is positioned adjacent to and outwardly of second acoustic barrier 154 and a third acoustic barrier 164 that is positioned adjacent to and outwardly of the third sound absorption member 162. For this embodiment, the third sound absorption member 162 is formed of the same material as the first and second sound absorption members 142, 152 (i.e., a mineral wool material) and the third acoustic barrier 164 is formed of the same material as the first and second acoustic barriers 144, 154 (i.e., a vinyl mat material). The third acoustic panel 160 further attenuates the sound and heat emanating from the engine 10 contained within the interior volume 120 of the enclosure 100. Although the depicted exemplary embodiment of FIG. 4 includes three acoustic panels, in alternative exemplary embodiments the first wall 112 (or one of the other walls 114, 116, 118 or roof 122 or floor 124) may include a single acoustic panel, two acoustic panels, or more than three acoustic panels.

The outer shell 110 is shown positioned outwardly of the first, second, and third acoustic panels 140, 150, 160 with respect to the interior volume 120. More specifically, the outer shell 110 is positioned adjacent to and outwardly of the third acoustic barrier 164. The outer shell 110 defines an exterior surface 166 of the enclosure 100. Further, as noted above, the outer shell 110 is formed of a composite material in this embodiment.

Figure 5:
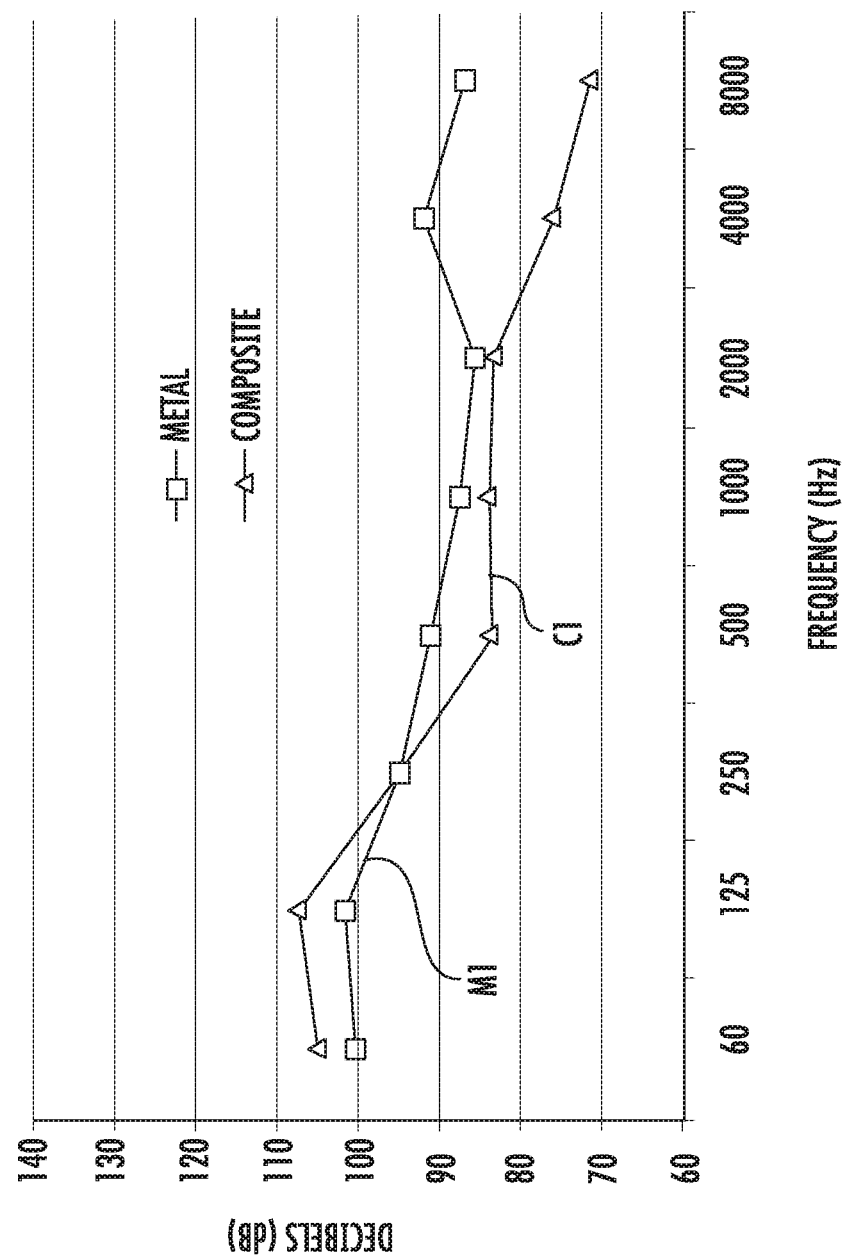
FIG. 5 provides a chart depicting the results of a noise test conducted for the enclosure of FIG. 3 that has a composite outer shell and a prior art enclosure that has a metal outer shell.

The construction of the wall depicted in FIG. 4 provides a number of advantages. For instance, noise attenuation in the human hearing frequency is improved, reducing the engine's contribution to the overall noise in the machinery space or engine room. For example, FIG. 5 provides a chart depicting the results of a noise test conducted for the wall of FIG. 4 that has a composite outer shell 110 and a wall of the prior art that has a metal outer shell. As shown in the chart, air-borne noise as a function of frequency is depicted for the two test cases. The metal test case, denoted as M1, proved to have better air-borne noise reduction in the frequency range between sixty and about two hundred fifty hertz (60-250 Hz) than the composite test case, denoted as C1. However, within the human hearing frequency range between about two hundred fifty hertz and eight thousand hertz (250-8,000 Hz), the composite test case C1 outperformed the metal test case M1. In particular, the composite test case C1 greatly outperformed the metal test case M1 in the frequency range between about 2,000 hertz and up. As shown in FIG. 5, the greatest delta between the two test cases is at about eight thousand hertz (8,000 Hz). Further, as noted above, the composite outer shell of the wall (or walls, roof, and floor of the enclosure) greatly reduce the weight of the enclosure, which as noted above, as numerous advantages.

Further, in some embodiments, due to the construction of the walls of the engine enclosure 100, such sound and heat attenuation improvements noted above may be achieved with a wall thickness that is less than about four inches (4 in.). As one example, the perforated sheet 134 has a thickness of three hundredths of an inch (0.03 in.). The first and second insulation panels 136, 138 have a combined total thickness of seven tenths of an inch (0.7 in.). The first, second, and third acoustic panels 140, 150, 160 each have a thickness of about one inch (1 in.), with the sound absorption members being about nine tenths of an inch (0.9 in.) and the acoustic barriers of each of the acoustic panels being about one tenth of an inch (0.1 in.). The composite outer shell 110 has a thickness of about three tenths of an inch (0.3 in.). Thus, the total thickness of the wall is about four and three hundredths inches (4.03 in.). It will be appreciated that the thicknesses of the layers of the wall provided above are not intended to be limiting; rather, the thicknesses provided above provide one example construction of the wall construction of the enclosure 100.

Figure 6:
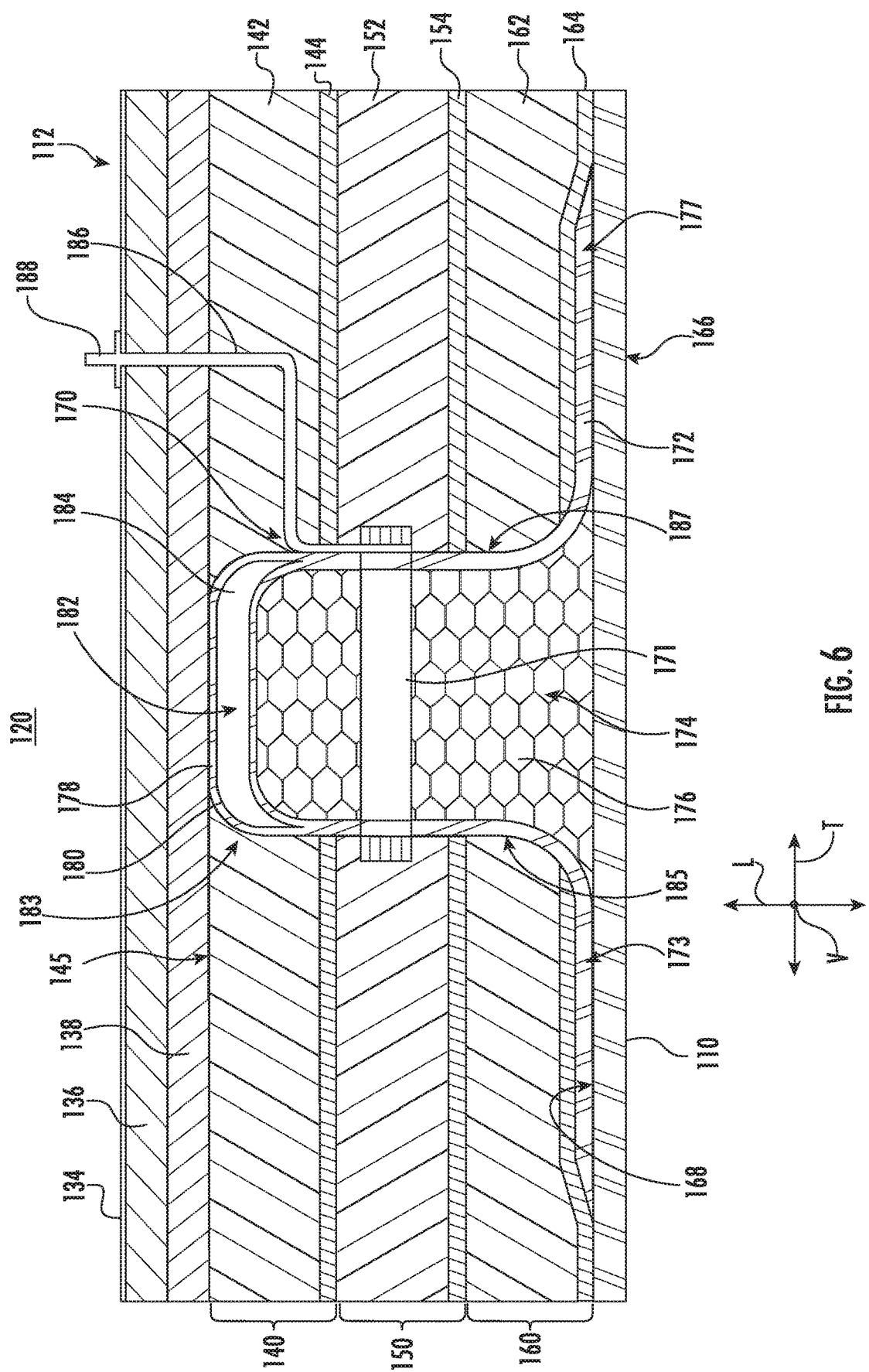
FIG. 6 provides another cross sectional view of one of the walls of the enclosure of FIG. 3 depicting a hat stiffener according to an exemplary embodiment of the present disclosure.

FIG. 6 provides another cross sectional view of one of the walls (or roof or floor) of the enclosure 100 of FIG. 3 depicting a hat stiffener 170 disposed therein according to an exemplary embodiment of the present disclosure. The wall depicted in FIG. 6 having the hat stiffener 170 is representative of the construction of one or more of the walls 112, 114, 116, 118, roof 122, or if included, the floor 124, of the engine enclosure 100 of FIG. 3. In FIG. 6, the wall is denoted as the first wall 112. Generally, the walls 112, 114, 116, 118, roof 122, and floor 124 may each include one or more hat stiffeners 170 that may provide for improved rigidity, component attachment, and sound and/or heat attenuation. Preferably, the walls, roof, and floor each have a plurality of hat stiffeners 170.

As shown in FIG. 6, the first wall 112 generally has the same construction as the exemplary first wall 112 depicted in FIG. 4 except that this portion of the wall has hat stiffener 170. For this embodiment, the hat stiffener 170 extends inwardly (with respect to the interior volume 120) from the composite outer shell 110 to the second insulation panel 138 along the lateral direction L. The hat stiffener 170 has a hat member 172 that defines a stiffener volume 174. More particularly, the hat member 172 and the outer shell 110 define the stiffener volume 174. A foam member 176 is disposed within stiffener volume 174 and fills the space in this embodiment. The foam member 176 provides sound and heat attenuation to the hat stiffener 170. The foam member 176 is formed of phenolic foam in this embodiment. Moreover, for this embodiment, the hat member 172 is formed of a composite material, and more particularly, the hat member 172 is formed of a triaxial carbon phenolic laminate.

The foam member 176 may receive a rib or structural member 171 extending through an opening defined by the foam member 176 as well as through openings defined by the hat member 172. The structural member 171 may provide a secure mounting structure for one or more pins or other components to attach to, e.g., as shown in FIG. 6. As depicted, a pin 186 is attached to structural member 171. The pin 186 extends inwardly from its attachment point with the structural member 171 toward the interior volume 120. A mounting structure 188 is attached to pin 186 and is disposed within the interior volume 120. Various items may be mounted to mounting structure 188 within the interior volume 120. In this way, hat stiffener 170 provides for secure component attachment to the wall 112 (or roof or floor).

With reference still to FIG. 6, the hat member 172 has a cross section shaped generally like a hat. As shown, with reference from left to right, the hat member 172 has a first flange 173 that is positioned adjacent to and is attached to an inner surface 168 of the outer shell 110. The first flange 173 is disposed between the outer shell 110 and the third acoustic barrier 164, e.g., along the lateral direction L. The hat member 172 has a hat portion 183 that generally extends inwardly from the outer shell 110 to an inner surface 145 of the first sound absorption member 142. For this embodiment, the hat portion 183 of the hat member 172 has a first sidewall 185 that extends along the lateral direction L. At an inner portion of the hat portion 183 of the hat stiffener 170, the first sidewall 185 of the hat member 172 splits into an inner member 178 and an outer member 180. The inner and outer members 178, 180 both extend generally along the transverse direction T and the inner member 178 is spaced form the outer member 180 along the lateral direction L. Stated differently, the inner member 178 is positioned inwardly of the outer member 180 with respect to the interior volume 120. An inner volume 182 is defined by the inner member 178 and the outer member 180. A stiffening member 184 is disposed within and fills the space of the inner volume 182. The stiffening member 184 is formed of a composite material in this embodiment, and more particularly, the stiffening member 184 is formed of one or more unidirectional carbon phenolic laminates. The unidirectional carbon phenolic laminates provide structural rigidity to the inner portion of the hat stiffener 170.

The inner member 178 and the outer member 180 reconnect at the other side of the hat portion 183 of the hat member 172. A second sidewall 187 extends along the lateral direction L from the connection point of the inner member 178 and the outer member 180. The second sidewall 187 is opposed to the first sidewall 185 and is spaced from the first sidewall 185, e.g., along the transverse direction T. The second sidewall 187 curves at an outer portion of the hat stiffener 170 into a second flange 177. The second flange 177 is positioned adjacent to and is attached to the inner surface 168 of the outer shell 110. The second flange 177 is disposed between the outer shell 110 and the third acoustic barrier 164, e.g., along the lateral direction L. As noted above, the construction of the depicted wall in FIG. 6 may provide for improved rigidity, component attachment, and sound and/or heat attenuation.

Figure 7:
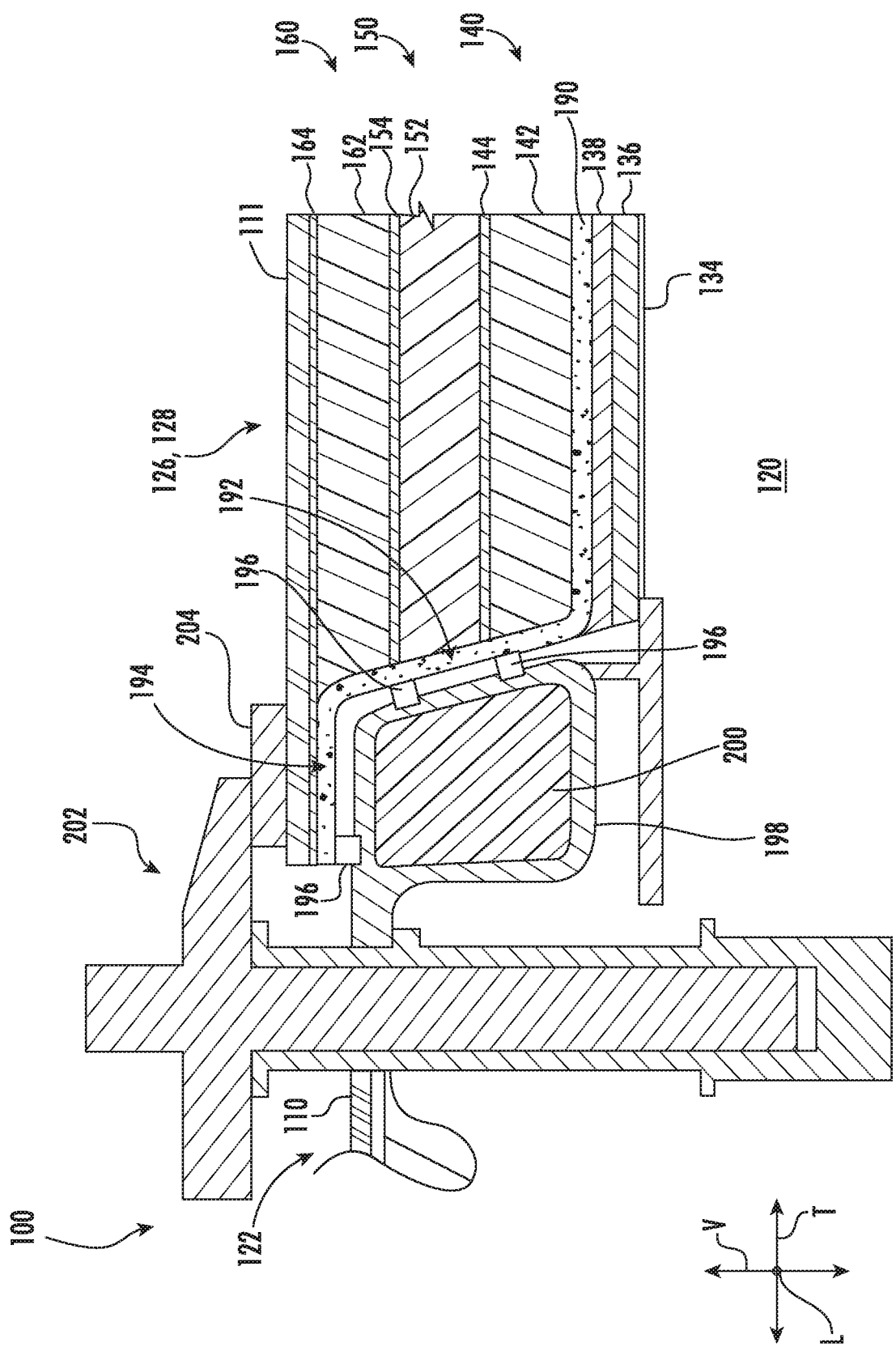
FIG. 7 provides a cross sectional view of one of the access points of the enclosure of FIG. 3 according to an exemplary embodiment of the present disclosure.

FIG. 7 provides a cross sectional view of one of the access points 126 of the enclosure 100 of FIG. 3 according to an exemplary embodiment of the present disclosure. The access point 126 depicted in FIG. 7 is representative of the construction of one or more of the access points 126 of the engine enclosure 100 of FIG. 3. In particular, the access point 126 of FIG. 7 is access hatch 128 that is removably mounted to roof 122 of engine enclosure 100.

As shown in FIG. 7, the access hatch 128 generally has the same construction as the exemplary first wall 112 depicted in FIG. 4 except for the features noted below. For this embodiment, the access hatch 128 includes an outer shell 111. Outer shell 111 of the access hatch 128 is formed of the same material as the outer shell 110 of the enclosure 100 (i.e., a composite material). More particularly, for this embodiment, the outer shell 111 of the access hatch 128 is formed of a carbon phenolic composite material. By forming the outer shell 111 of the access hatch 128 of a composite material, the weight of the access hatch is reduced, e.g., compared to an access hatch having a carbon steel outer shell. This may, for example, may allow an operator to more readily move the access hatch 128.

With reference still to FIG. 7, for this embodiment, the access hatch 128 has a cured epoxy layer 190. The epoxy layer 190 may be an epoxy adhesive, for example. As shown, the epoxy layer 190 is disposed between the second insulation panel 138 and the first sound absorption member 142. Further, as shown, the epoxy layer 190 forms an outer surface of the access hatch 128 along a sidewall 192 and along a flange 194 of the access hatch 128. A plurality of sealing members 196 are attached to the epoxy layer 190, and when the access hatch 128 is positioned within an opening defined by the roof 122, the sealing members 196 are positioned between the sidewall 192 of the access hatch 128 and a frame 198 of the outer shell 110 for sealing the access hatch 128 with the enclosure 100. The frame 198 of the outer shell 110 defines an interior volume. A foam core 200 is disposed within the interior volume defined by the frame 198 for sound and heat attenuation. To seal the access hatch 128 against the frame 198 with the sealing elements 196, a latch assembly 202 is pressed downward along the vertical direction V to compress a strike plate 204 against the composite outer shell 111 of the access hatch 128. This in turn compresses the sealing elements 196 between the sidewall 192 of the access hatch 128 and the frame 198 of the outer shell 110.

Further, as shown in FIG. 7, in sequence outwardly from the interior volume 120 of the enclosure 100, the access hatch 128 includes perforated sheet 134. The first and second insulation panels 136, 138 are positioned outwardly of the perforated sheet 134 for providing insulation. The epoxy layer 190 is positioned outwardly of the first and second insulation panels 136, 138 along at least a part of the access hatch 128. First, second, and third acoustic panels 140, 150, 160 are positioned outwardly from the epoxy layer 190 with respect to the interior volume 120. Each of the acoustic panels 140, 150, 160 include respective sound absorption members and outwardly positioned acoustic barriers. The outer shell 111 of the access hatch 128 is positioned outwardly of the acoustic panels 140, 150, 160. More particularly, the outer shell 111 of the access hatch 128 is positioned adjacent to and outwardly of the third acoustic barrier 164 of the third acoustic panel 160. In addition to the advantage of the weight reduction of the access hatch 128 as noted above, the construction of the access hatch 128 depicted in FIG. 7 provides many of the same advantages of the construction of the wall of FIG. 4. For instance, noise attenuation in the human hearing frequency and heat attenuation may be improved, among other benefits.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An enclosure for containing at least a portion of a gas turbine engine, the enclosure comprising:
   at least one wall defining at least a portion of an interior volume of the enclosure, the wall of the enclosure comprising:
   a first insulation panel;
   a sound absorption member positioned outwardly of the first insulation panel with respect to the interior volume;
   an acoustic barrier positioned adjacent to and outwardly of the sound absorption member with respect to the interior volume;
   an outer shell positioned outwardly of the acoustic barrier with respect to the interior volume, wherein the outer shell is formed as a monolithic unitary composite component from a composite material, the outer shell coupling the at least one wall.

2. The enclosure of claim 1, wherein the sound absorption member is a first sound absorption member and the acoustic barrier is a first acoustic barrier, and wherein the wall of the enclosure further comprises:
   a second sound absorption member positioned outwardly of the first acoustic barrier with respect to the interior volume; and
   a second acoustic barrier positioned adjacent to and outwardly of the second sound absorption member with respect to the interior volume.

3. The enclosure of claim 2, wherein the wall of the enclosure further comprises:
   a third sound absorption member positioned outwardly of the second acoustic barrier with respect to the interior volume; and a third acoustic barrier positioned adjacent to and outwardly of the third sound absorption member with respect to the interior volume.

4. The enclosure of claim 3, wherein the third acoustic barrier is positioned adjacent to and inwardly of the outer shell.

5. The enclosure of claim 1, further comprising:
a second insulation panel positioned between the first insulation panel and the sound absorption member.

6. The enclosure of claim 5, wherein the second insulation panel is positioned adjacent to the first insulation panel.

7. The enclosure of claim 1, wherein the acoustic barrier is a vinyl mat.

8. The enclosure of claim 1, further comprising:
a perforated sheet positioned adjacent to and inwardly of the first insulation panel.

9. The enclosure of claim 8, wherein the perforated sheet is formed of a Polyethylene Terephthalate material.

10. The enclosure of claim 1, wherein the sound absorption member is formed of mineral wool.

11. The enclosure of claim 1, wherein the composite material of the outer shell is a carbon fiber reinforced phenolic composite material.

12. The enclosure of claim 1, wherein the wall has a thickness that is less than or equal to about four (4) inches.

13. An enclosure for containing at least a portion of a gas turbine engine, the enclosure comprising:
a plurality of walls defining an interior volume, a monolithic outer shell coupling adjacent walls and forming at least a portion of each of the walls, the monolithic outer shell formed of a composite material, at least one of the walls comprising:
a first insulation panel;
a sound absorption member positioned outwardly of the first insulation panel with respect to the interior volume; and
an acoustic barrier positioned adjacent to and outwardly of the sound absorption member with respect to the interior volume;
wherein the outer shell is positioned outwardly of the acoustic barrier with respect to the interior volume.

14. The enclosure of claim 13, wherein the enclosure further comprises:
a roof coupled with one or more of the plurality of walls by the monolithic outer shell, and wherein the outer shell forms at least a portion of the roof.

15. The enclosure of claim 13, wherein the enclosure further comprises:
a floor coupled with one or more of the plurality of walls by the monolithic outer shell, and wherein the outer shell forms at least a portion of the floor.

16. The enclosure of claim 13, further comprising:
an access point for selectively accessing the interior volume of the enclosure, the access point comprising:
a perforated sheet;
an insulation panel positioned outwardly of the perforated sheet with respect to the interior volume;
an epoxy layer positioned outwardly of the insulation panel along at least a part of the access point with respect to the interior volume;
at least one acoustic panel positioned outwardly of the epoxy layer with respect to the interior volume; and
an outer shell positioned outwardly of the acoustic panel with respect to the interior volume.

17. An enclosure for containing at least a portion of a gas turbine engine, the enclosure comprising:
at least one wall defining at least a portion of an interior volume of the enclosure, the wall of the enclosure comprising:
a first insulation panel;
an acoustic panel positioned outwardly of the first insulation panel with respect to the interior volume, the first acoustic panel comprising a sound absorption member and an acoustic barrier;
an outer shell formed of a composite material and positioned outwardly of the acoustic panel with respect to the interior volume; and
a hat stiffener, comprising:
a hat member defining a stiffener volume, the hat member comprising a first flange attached to the outer shell, a hat portion extending inwardly from the outer shell, and a second flange attached to the outer shell; and
a foam member disposed within the stiffener volume.

18. The enclosure of claim 17, wherein the hat member further comprises:
an inner member;
an outer member positioned outwardly of the inner member with respect to the interior volume, the inner and outer members of the hat member positioned at an inner portion of the hat member, wherein the inner member and the outer member define an inner volume; and
a stiffening member disposed within the inner volume.

19. The enclosure of claim 17, wherein the acoustic panel is a first acoustic panel and the sound absorption member is a first sound absorption member and the acoustic barrier is a first acoustic barrier, and wherein the first acoustic barrier is positioned outwardly of the first sound absorption member with respect to the interior volume, and wherein the wall of the enclosure further comprises:
a second acoustic panel positioned outwardly of the first acoustic panel with respect to the interior volume, the second acoustic panel comprising a second sound absorption member and a second acoustic barrier; and
a third acoustic panel positioned outwardly of the second acoustic panel with respect to the interior volume, the third acoustic panel comprising a third sound absorption member and a third acoustic barrier;
wherein the hat portion extends inwardly from the outer shell to an inner surface of the first sound absorption member.

20. The enclosure of claim 19, wherein the first flange is disposed between the third acoustic barrier and the outer shell and the second flange is disposed between the third acoustic barrier and the outer shell.

* * * * *